United States Patent [19]

Bremer et al.

[11] Patent Number: 5,311,578
[45] Date of Patent: May 10, 1994

[54] TECHNIQUE FOR AUTOMATIC IDENTIFICATION OF A REMOTE MODEM

[75] Inventors: Gordon Bremer, Clearwater; Kurt E. Holmquist, Largo; Donald R. Laturell, Tampa; Kenneth Martinez, both of Tampa, all of Fla.

[73] Assignee: AT&T Bell Laboratories, Murray Hill, N.J.

[21] Appl. No.: 879,492

[22] Filed: May 7, 1992

[51] Int. Cl.⁵ .................. H04M 11/00; H04B 1/38
[52] U.S. Cl. ............................. 379/97; 375/8
[58] Field of Search ............. 375/8, 9, 121, 112, 375/114; 379/91, 97, 93, 98

[56] References Cited

U.S. PATENT DOCUMENTS

| | | | |
|---|---|---|---|
| 4,215,243 | 7/1980 | Maxwell | 179/2 |
| 4,680,773 | 7/1987 | Amundson | 375/8 |
| 4,782,498 | 11/1988 | Copeland, III | 375/8 |
| 4,924,456 | 5/1990 | Maxwell et al. | 370/32 |
| 4,931,250 | 6/1990 | Greszczuk | 375/8 |
| 5,144,651 | 9/1992 | Cooper | 375/8 |

*Primary Examiner*—Curits Kuntz
*Assistant Examiner*—Irmindra S. Rana
*Attorney, Agent, or Firm*—Joseph J. Opalach; Henry T. Brendzel

[57] ABSTRACT

In the public switched telephone network, an originating modem can identify an answering modem, e.g., as to the type of modem it is, by detection of a low-level identification signal sent from the answering modem. The low-level identification signal is hidden within an industry standard "answer tone," e.g., a CCITT V.25 answer tone of 2100 Hz. If the low-level identification signal is detected by the originating modem, the industry standard "handshaking" procedure is terminated and a non-standard handshaking procedure is implemented. If the identification signal is not detected by the originating modem, the industry standard handshaking procedure is simply completed.

7 Claims, 2 Drawing Sheets

1

TECHNIQUE FOR AUTOMATIC IDENTIFICATION OF A REMOTE MODEM

BACKGROUND OF THE INVENTION

This invention relates to data communications techniques used in modems. More particularly, this invention relates to a method and apparatus for an originating modem to identify an answering modem.

In a dial-up communications network, e.g., the public switched telephone network (PSTN), an originating modem does not necessarily know what type of modem will answer the data call. As a result, the originating modem typically assumes that all data calls are made to a "generic" modem and that all "initial handshaking" and initial communications must be done according to established industry standards like International Telegraph and Telephone Consultative Committee (CCITT) V.25. For example, in order to establish a data connection, the originating modem dials the telephone number of the location where the answering modem is located. The answering modem detects the ringing signals on the telephone line and answers the telephone call. At this point the answering modem places an "answer tone" on the telephone line. The originating modem detects the answer tone and then places an "originating carrier" on the line. When the answering modem detects the originating carrier, the answering modem places an "answering carrier" on the line and the initial handshaking process is completed, i.e., a physical data connection is established between the originating modem and the answering modem. From this point forward, the originating modem and the answering modem can execute additional handshaking and protocol procedures (like CCITT V.32) to further establish the desired level of connection, e.g. the desired baud rate, communications protocol, etc.

As described above, a data communications industry standard, like CCITT V.25, provides a common reference point whereby a modem manufacturer can ensure its modem will be able to communicate with modems produced by other manufacturers. However, in offering data communications services to a customer, the data communications industry standards may not provide all of the features that a customer may desire, or may not provide the features in a manner that suits a particular modem manufacturer. For example, a modem manufacturer may be of the view that a network management feature properly requires that a secondary communications channel also be established between the originating modem and the answering modem—however, available industry standards may not provide for this type of a secondary channel. Another example is to allow faster connection between the modems by shortening the time required to determine modem types.

As a result, after the establishment of the switched data connection between an originating modem and an answering modem, it may be desired to switch to a proprietary form of operation in order to offer non-industry standard features to a customer. Consequently, this requires that the originating modem and the answering modem be the same type of modem and requires these modems to perform some additional handshaking process in order to identify each other.

Various techniques have been disclosed in a number of U.S. Patents which provide for an originating modem and an answering modem to identify each other. U.S. Pat. No. 4,215,243, issued to Maxwell on Jul. 29, 1980, provides an ability to generally identify a modem as to the type of industry standard protocol it supports (as opposed to identifying a particular manufacturer's modem) by identifying the frequency of the originating carrier after the answer tone has been provided from the answering modem. U.S. Pat. No. 4,680,773, issued to Amundson on Jul. 14, 1987, discloses a technique for sending special characters after the physical data connection is established. These special characters, when detected, allow the originating modem and answering modems to identify each other for changing to a proprietary form of operation. Finally, U.S. Pat. No. 4,782,498, issued to Copeland, III on Nov. 1, 1988, establishes a special mode for proprietary use by means of a special handshake procedure. For example, upon answering the telephone call, the answering modem will not provide the industry standard answering tone but, instead, provide a special sequence of characters. If the originating modem recognizes the special sequence of characters it will signal to the answering modem that it is of the same type, and both modems can then switch to a proprietary form of operation. However, if the originating modem does not recognize the special sequence of characters it will "time-out" and either assume a default operation or drop the line assuming that the no modem has answered.

As can be seen from the above prior art, there are basically two ways to provide identification between modems. One method first establishes the physical data connection before the originating modem and the answering modem attempt to identify each other through an additional handshaking procedure. Unfortunately, this only adds to the delay that already exists in establishing the physical data connection—a delay which is already on the order of 3 to 8 seconds depending on network delays. The second method uses a proprietary handshaking process before establishing the physical data connection, with the result that an incompatible originating modem may become confused and drop the connection. Consequently, it may be necessary to avoid any attempt at identification between the modems in order to eliminate this possibility—with the result that any non-standard industry features have to be manually administered when both the originating modem type and answering modem type are known a priori.

SUMMARY OF THE INVENTION

According to the principles of this invention, an improved modem is constructed in which an identification signal is combined with, or hidden within, an industry standard answering signal.

In an embodiment of the invention, an originating modem initiates a data call by dialing a telephone number of a remote modem. The remote modem, constructed in accordance with this invention, provides a signal comprising a standard CCITT V.25 answer tone of 2100 Hz and an identification signal. In this illustrative embodiment the identification signal is represented by an identification tone "A," the identification tone being hidden within the answer tone. The energy level of this identification tone is below the CCITT defined energy levels of the V.25 answer tone. In particular, the identification tone energy level is set low enough to appear as a part of the background noise to a conventional modem. In other words, the conventional modem would not detect the identification tone. The originating modem detects identification tone "A" and sends an identification tone "B" while still receiving the V.25 answer tone. The answering modem receives identification tone "B" and provides a confirmation tone "C" while still sending the V.25 answer tone. Finally, the originating modem detects the confirmation tone "C," and sends back confirmation tone "D" while still receiving the V.25 answer tone. As a result, both the originating modem and the answering modem have identified each other. Alternatively, if the answering modem is a conventional modem, the originating modem only detects the CCITT V.25 answer tone without identification tone "A." Consequently, the originating modem merely completes the call establishment process.

One feature of the invention is that no additional time is added to the prior art call establishment process and in fact, the process can be shortened. As a result, upon the receipt of tones "C" and "D" by the respective modems, the CCITT V.25 call establishment procedure is terminated by both the originating and the answering modem. This early termination of the CCITT V.25 call establishment procedure not only avoids any subsequent delays in the originating modem and the answering modem identifying each other, but also establishes the physical data connection faster than the CCITT V.25 call establishment procedure.

Another feature of the invention is that it allows an improved modem to query another conventional modem with a proprietary handshaking process that does not interfere with the conventional modem's operation. As a result, since the CCITT V.25 call establishment procedure is not interfered with, there is no danger of a conventional modem becoming confused and dropping the connection.

DETAILED DESCRIPTION

Figure 1:
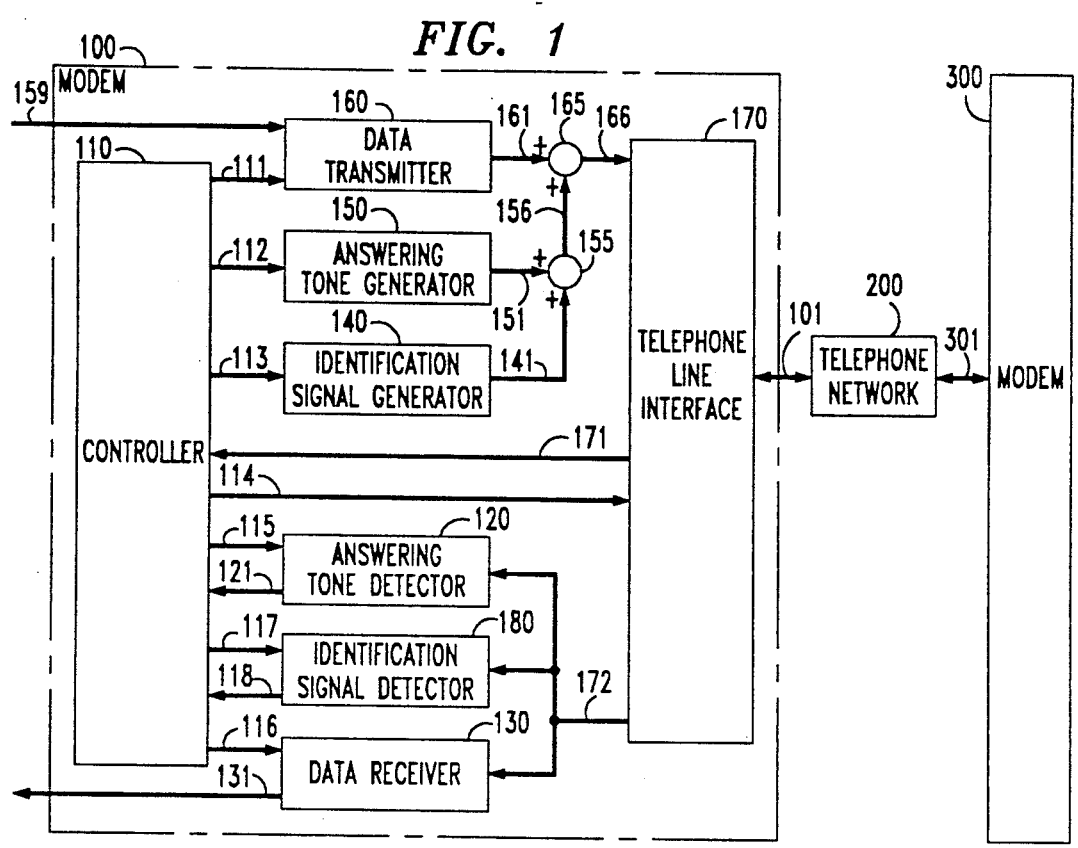
FIG. 1 is a block diagram of a modem embodying the principles of the invention.

FIG. 1 shows a modem that embodies the inventive concept of this invention. The individual components of the data communications system are well-known and are not described in detail.

As shown, modem 100 is connected to telephone network 200 via telephone line 101. Similarly, modem 300 is connected to telephone network 200 via telephone line 301. Either modem 100 or modem 300 can place a telephone call to another modem by going "off-hook" and following standard dialing procedures. Modem 100 comprises data transmitter 160, answering tone generator 150, identification signal generator 140, adders 155 and 165, answering tone detector 120, identification signal detector 180, telephone line interface 170, data receiver 130, and controller 110.

In the following first example, it is assumed that modem 300 is identical to modem 100, i.e., that modem 300 also embodies the principles of the invention. Modem 300 is the originating modem and places a telephone call to modem 100 through telephone network 200. Telephone line interface 170 of modem 100 answers the telephone call (e.g., by going "off-hook") and signals controller 110, via lead 171, that a telephone call has been answered. Controller 110, via lead 112, turns on answering tone generator 150, which provides a V.25 compatible answer tone (V.25 answer tone) to adder 155. At the same time, controller 110 turns on identification signal generator 140 to provide an identification tone "A" for 500 milliseconds on lead 141, which is applied to adder 155. Identification signal generator 140 is capable of providing a plurality of different tones which are different from the V.25 answer tone. The type and duration of the identification tone is controlled by controller 110 via lead 113, which is representative of a plurality of control signals. Adder 155 provides the sum of the V.25 answer tone and identification tone "A" on lead 156, which is applied to adder 165. Since the data connection has not yet been established, there is no signal present on lead 161. As a result, the output of adder 165 is the sum of the V.25 answer tone and identification tone "A." This output signal is applied to telephone line interface 170 for transmission to modem 300 via telephone line 101, telephone network 200 and telephone line 301.

Figure 2:
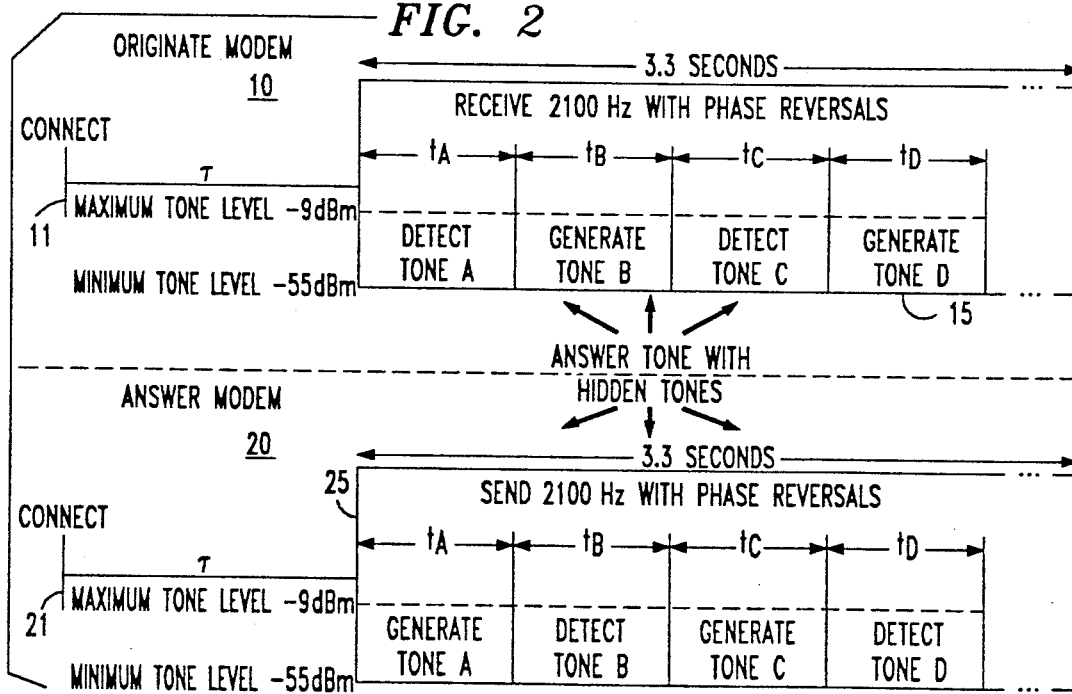
FIG. 2 is a shows a representative call establishment sequence embodying the principles of the invention.

As described above, the identification tone is combined with the V.25 answer tone by adder 155. A feature of this invention is that any identification tone, e.g., identification tone "A," is "hidden" within the V.25 answer tone. In particular, the energy level of the identification tone is below the minimum energy level specified for the V.25 answer tone. In other words, any identification tone is a "low-level" tone. In this example, the V.25 answer tone, as defined in the CCITT standard, comprises a single frequency of 2100 Hz, with a minimum energy level of −9 dBm. The energy level of an identification tone, e.g., identification tone "A," is below this minimum energy level of the V.25 answer tone. This feature is shown in FIG. 2, which shows two call establishment sequences. Sequence 10 represents the call establishment sequence followed by originating modem 300, while sequence 20 represents the call establishment sequence followed by answering modem 100. The time when telephone interface 170 answers the telephone call is represented by vertical bar 21, which is labeled connect. A time $\tau$ later, the sum of the V.25 answer tone and identification tone "A" is applied to telephone line interface 170 (as described above). The V.25 answer tone as provided by the answering modem is represented by block 25. The vertical height of block 25 represents the variation in the energy level in dBm of this combined answer tone signal. As mentioned above, the V.25 answer tone has a defined maximum energy level of −9 dBm. Below this maximum level of the V.25 answer tone is the permissible range of identification tone "A." As shown in FIG. 2, the energy of any identification tone can vary between the limits of −9 dBm to −55 dBm. Therefore, during time period $t_4$, DTMF identification tone "A" is hidden within the V.25 answer tone. As can be further seen, if a conventional modem was the originating modem, it would only detect the V.25 answer tone and would not detect the presence of any hidden identification tone. As a result, these hidden identification signals do not interfere with the defined call establishment process and signal levels of CCITT V.25.

As shown in FIG. 2, any identification tone is generated or detected within a particular time period. Continuing with the above first example, controller 110 turns on identification signal generator 140 to generate identification tone "A" for 500 milliseconds, which is the duration of time interval $t_A$. At the end of time period $t_A$, controller 110 turns off identification signal generator 140 and turns on signal detector 180, via lead 117, to look for identification tone "B" from the originating modem for the next 500 milliseconds, which is shown in FIG. 2 as time period $t_B$. Modem 300 detects identification tone "A" during time period $t_A$ and sends identification tone "B" (described below) during time period $t_B$ to modem 100 via telephone line 301, telephone network 200 and telephone line 101. Telephone interface 170, of modem 100, receives identification tone "B" from telephone line 101 and provides identification tone "B" to identification signal detector 180. The latter detects identification tone "B" and signals controller 110 that this tone has been detected during time period $t_B$. As a result, controller 110 then turns on identification signal generator 140 to generate identification tone "C" for 500 milliseconds, which occurs during time period $t_C$. Similar to the description above, identification tone "C" is hidden within the V.25 answer tone and is transmitted to modem 300. At the end of time period $t_C$, controller 110 then turns off identification signal generator 140 and turns on signal detector 180 to look for identification tone "D" from the originating modem for the next 500 milliseconds, which is shown in FIG. 2 as time period $t_D$. Modem 300 detects identification tone "C" during time period $t_C$ and sends identification tone "D" (described below) to modem 100. Telephone interface 170 receives identification tone "D" from telephone line 110 and provides identification tone "D" to identification signal detector 180. The latter detects identification tone "D" and signals controller 110. At this point, modem 300 and modem 100 have completed executing an illustrative "handshaking" call establishment sequence by using hidden signals within a standard V.25 answer tone. The successful completion of this call establishment sequence allows modem 300 and modem 100 to identify each other as a particular type of modem. That is, the low-level identification tones provided by each modem characterizes that modem as a particular type of modem to the far, or remote, modem. This enables the modems to then establish non-standard, or proprietary, operation that is transparent to any particular users of these modems.

From FIG. 2, another feature of the invention is illustrated. In particular, the handshaking process provided by the exchange of these hidden identification tones is faster than the required time interval for just the V.25 answer tone. The V.25 answer tone lasts for at least 3.3 seconds, while, as described above, the handshaking process between modem 100 and 300 completed after only 2 seconds. It should also be noted that there are further steps not illustrated herein in the V.25 call establishment sequence that provide additional delay and which are advantageously avoided by this invention.

Figure 3:
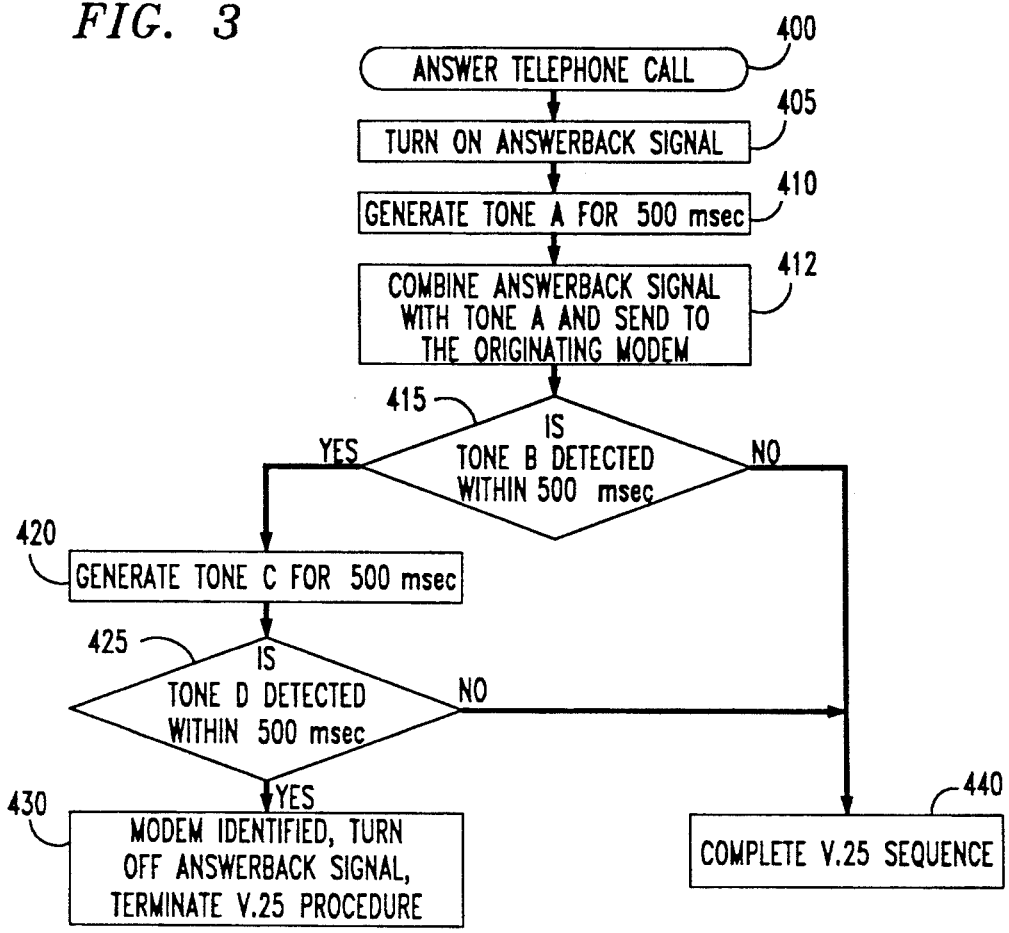
FIG. 3 is a flow diagram of a method embodying the principles of the invention for use in an answering modem.

An illustrative method for an answering modem embodying the principles of the invention is shown in FIG. 3. In particular, modem 100 is the answering modem for a telephone call that has been placed by modem 300. As shown in block 400, modem 100 answers the telephone call and then turns on a V.25 answer tone (block 405), and generates identification tone "A" for 500 milliseconds (block 410). The V.25 answer tone and identification tone "A" are combined and sent to modem 100 (block 412). Modem 100 then waits for the detection of identification tone "B" (block 415). If identification tone "B" is not detected within 500 milliseconds, modem 100 merely completes the remaining V.25 call establishment sequence with modem 300 (block 440). In this particular case, it would be assumed by modem 100 that modem 300 is a conventional modem.

However, if modem 100 detects identification tone "B" within the 500 milliseconds, modem 100 then generates identification tone "C" for 500 milliseconds (block 420). At this point, modem 100 will then wait 500 milliseconds and then begin to look for identification tone "D" for 500 milliseconds (block 425). If identification tone "D" is not detected within 500 milliseconds, modem 100 merely completes the remaining V.25 call establishment sequence with modem 300 (block 440). Again, in this particular case, modem 100 assumes that modem 300 is a conventional modem.

However, in accordance with the principles of this invention, if modem 100 detects identification tone "D," modem 100 has identified modem 300 as an improved modem and turns off the V.25 answer tone even though the V.25 call establishment sequence has not been completed (block 430).

Figure 4:
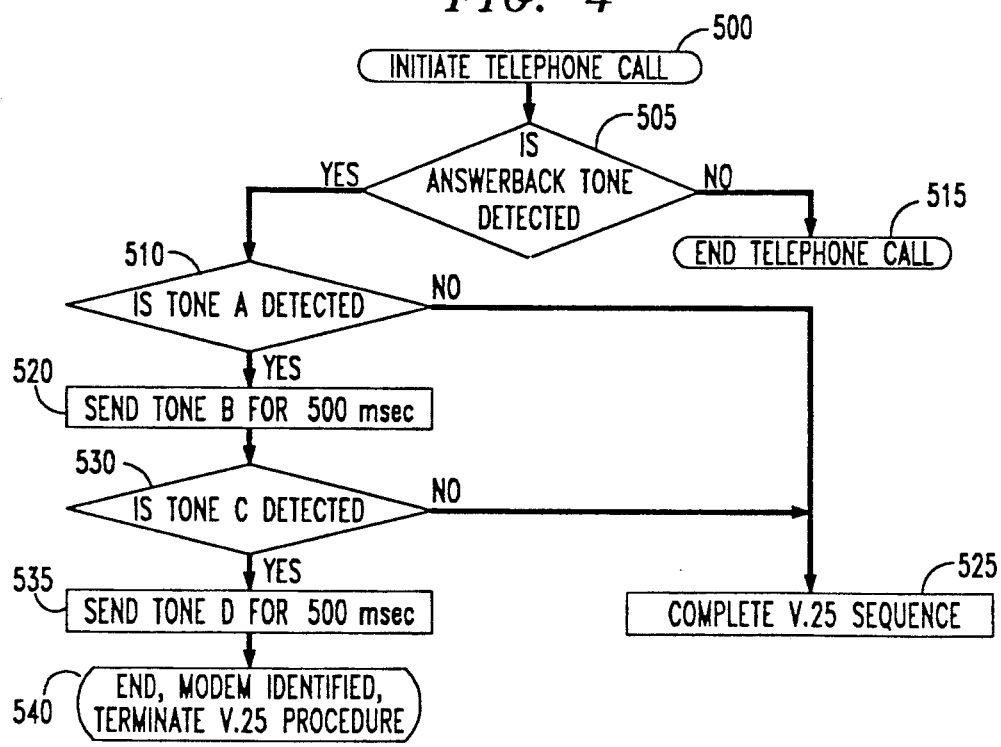
FIG. 4 is a flow diagram of a method embodying the principles of the invention for use in an originating modem.

Turning now to FIG. 4, a representative method for use when modem 100 is the originating modem is shown. In particular, modem 100 initiates a telephone call to modem 300 (block 500). Specifically, controller 110 initiates a telephone call to modem 300 by instructing telephone line interface 170 to go off-hook and apply a sequence of DTMF tones that are representative of the telephone number of modem 300 to telephone line 101. Modem 100 then searches for a V.25 answer tone from the far modem (modem 300) by turning on answering tone detector 120. At this point, controller 110 has disabled answering tone generator 150 and identification signal generator 140. If modem 100 does not receive the V.25 answer tone, modem 100 drops the telephone call, e.g., goes on-hook, (block 515). However, if modem 100 receives the V.25 answer tone, modem 100 then searches for identification tone "A" (block 510). In particular, controller 110 turns on, via lead 117, identification signal detector 180 to search for identification tone "A" for the next 500 milliseconds. If identification tone "A" is not detected within 500 milliseconds, modem 100 completes the standard V.25 call establishment sequence (block 525). On the other hand, if modem 100 detects identification tone "A," modem 100 then sends identification tone "B" for 500 milliseconds (block 520) by turning on identification signal generator 140 to sent tone "B." After sending identification tone "B" for 500 milliseconds, modem 100 then searches for identification tone "C" (block 530). This is accomplished by controller 110 turning on identification signal detector 180 to search for identification tone "C" for the next 500 milliseconds. If identification tone "C" is not detected within 500 milliseconds, modem 100 completes the standard V.25 call establishment process (block 525). However, if modem 100 detects identification tone "C," modem 100 then sends identification tone "D" for 500 milliseconds (block 535). As similarly described above, controller 110 turns on identification signal generator 140 to send tone "D." After sending identification tone "D," modem 100 aborts the V.25 call establishment process (block 540). As a result, modem 100 and modem 300 have successfully completed, in accordance with the principles of the invention, a non-standard call establishment process that does not interfere with a standard call establishment process like V.25.

The foregoing merely illustrates the principles of the invention and it will thus be appreciated that those skilled in the art will be able to devise numerous alternative arrangements which, although not explicitly described herein, embody the principles of the invention and are within its spirit and scope.

For example, although the invention is illustrated herein as being implemented with discrete functional building blocks, e.g., detectors, tone generators, etc., the functions of any one or more of those building blocks can be carried out using one or more appropriate programmed processors. In addition, the handshaking process can be shorter, e.g., the identification process can end after the exchange of identification tones "A" and "B."

Also, other forms of hidden signals may be used as long as the signaling characteristics do not interfere with the standard call establishment procedure. For example, multiple tones, spread spectrum techniques may also be used.

We claim:

1. Apparatus for providing an identification signal from an answering modem to an originating modem comprising:
   means responsive to a ringing signal for generating an answer tone with a finite duration T, where $T>0$ seconds;
   means for generating a predetermined identification signal, the predetermined identification signal having a duration less than the answer tone;
   means for combining the identification signal and the answer tone to provide a combined signal; and
   means for sending the combined signal to the originating modem.

2. The apparatus of claim 1 wherein the energy level of the predetermined identification signal is below a predetermined minimum energy level of the answer tone.

3. Apparatus in an answering modem for establishing a data connection to an originating modem during a call establishment procedure, the apparatus comprising:
   means for receiving a ringing signal from a communications channel; and
   means responsive to the ringing signal to concurrently apply to the communications channel at least an answer tone and an identification signal for transmission to the originating modem, the answer tone being of finite duration, and the identification signal being of finite duration less than the answer tone where the identification signal represents a characterization of the answering modem.

4. The apparatus of claim 3 wherein the maximum energy level of the identification signal is within the energy level of a background noise signal that is expected to be present on the communications channel.

5. A method for identifying a remote modem comprising the steps of:
   a. placing a telephone call from a first modem to the remote modem over a switched telephone network;
   b. receiving from the remote modem an answer signal;
   c. detecting in the answer signal an answer tone and a second signal, the second signal being of shorter duration than the answer tone; and
   d. comparing the second signal to a predetermined identification signal for determining the identity of the remote modem.

6. The method of claim 5 comprising the further steps of:
   e. matching the second signal to the predetermined identification signal whereby the first modem identifies the remote modem;
   f. sending a third signal to the remote modem, the third signal representing a predetermined identification signal of the first modem; and
   g. receiving from the remote modem a fourth signal, the fourth signal representing an acknowledgment from the remote modem that the third signal was received.

7. A method for use in a modem for identifying a remote modem during a standard call establishment procedure, the standard call establishment procedure comprising a standard signal that is sent from the remote modem to the modem, the method comprising the steps of:
   receiving the standard signal in the modem;
   detecting in the standard signal a hidden signal, the hidden signal being representative of the identity of the remote modem; and
   sending a different hidden signal from the modem to the remote modem for signaling to the remote modem the identity of the modem.

* * * * *